(12) United States Patent
Hong et al.

(10) Patent No.: US 12,315,058 B2
(45) Date of Patent: May 27, 2025

(54) METHOD AND APPARATUS WITH OBJECT MOTION TRANSFER

(71) Applicants: Samsung Electronics Co., Ltd., Suwon-si (KR); Korea Advanced Institute of Science and Technology, Daejeon (KR)

(72) Inventors: Seokpyo Hong, Suwon-si (KR); Junyong Noh, Daejeon (KR); Soojin Choi, Daejeon (KR); Chaelin Kim, Daejeon (KR); Kyungmin Cho, Daejeon (KR); Jiyeon Kim, Hwaseong-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 173 days.

(21) Appl. No.: 17/980,817

(22) Filed: Nov. 4, 2022

(65) Prior Publication Data
US 2023/0252707 A1   Aug. 10, 2023

(30) Foreign Application Priority Data

Feb. 9, 2022   (KR) .......................... 10-2022-0016651

(51) Int. Cl.
*G06T 13/40*   (2011.01)
(52) U.S. Cl.
CPC ................................... *G06T 13/40* (2013.01)
(58) Field of Classification Search
CPC .... G06T 7/20; G06T 7/70; G06T 7/73; G06T 7/579; G06T 13/40
See application file for complete search history.

(56) References Cited

U.S. PATENT DOCUMENTS

| 8,928,659 B2 | 1/2015 | Bar-Zeev et al. |
| 9,602,767 B2 | 3/2017 | Travis et al. |
| (Continued) | | |

FOREIGN PATENT DOCUMENTS

| KR | 10-2016-0124493 A | 10/2016 |
| KR | 10-2020-0005894 A | 1/2020 |
| (Continued) | | |

OTHER PUBLICATIONS

Yoon, Leonard, et al. "Placement retargeting of virtual avatars to dissimilar indoor environments." *IEEE Transactions on Visualization and Computer Graphics* (2020). pp 1-15.

Yoon, Leonard, et al. "A mixed reality telepresence system for dissimilar spaces using full-body avatar." *SIGGRAPH Asia 2020 XR.* (2020). pp 1-2.

(Continued)

*Primary Examiner* — Antonio A Caschera
(74) *Attorney, Agent, or Firm* — NSIP Law

(57) ABSTRACT

An apparatus transfers object motion in a source space to a target space. The apparatus defines a mapping function from the source space to the target space based on feature points of the object-positioned source space, and feature points of the object-represented target space; determines a target root position corresponding to a root position of the object based on the mapping function; determines a target direction corresponding to a direction of the object, based on the mapping function; determines a target main joint corresponding to a main joint of the object based on the mapping function; determines a target sub-joint excluding the target main joint in the target space based on unique joint information of the object; and generates data representing the object motion in the target space by modifying a pose of the object in the target space to match the target main joint.

20 Claims, 12 Drawing Sheets

(56) References Cited

U.S. PATENT DOCUMENTS

| | | | |
|---|---|---|---|
| 10,755,145 B2 | 8/2020 | Bhagavatula et al. | |
| 11,024,060 B1 | 6/2021 | Ma et al. | |
| 11,587,239 B2* | 2/2023 | Baumbach | G06V 20/10 |
| 11,625,881 B2* | 4/2023 | Villegas | G06T 15/40 |
| | | | 345/473 |
| 2020/0320719 A1* | 10/2020 | Lee | G06T 7/20 |
| 2021/0158616 A1* | 5/2021 | Li | G06T 17/10 |
| 2021/0350612 A1 | 11/2021 | Emami et al. | |
| 2022/0203526 A1* | 6/2022 | Bai | B25J 9/1651 |

FOREIGN PATENT DOCUMENTS

| | | |
|---|---|---|
| KR | 10-2237124 B1 | 4/2021 |
| WO | WO 2016/076951 A1 | 5/2016 |
| WO | WO 2019/005999 A1 | 1/2019 |
| WO | WO 2021/069945 A1 | 4/2021 |

OTHER PUBLICATIONS

Starke, Sebastian, et al. "Neural state machine for character-scene interactions." *ACM Trans. Graph.* vol. 38. Issue 6. Article 178. (2019). pp 1-14.

Al-Asqhar, Rami Ali, et al. "Relationship descriptors for interactive motion adaptation." *Proceedings of the 12th ACM SIGGRAPH/ Eurographics Symposium on Computer Animation.* (2013). pp 45-54.

Kim, Yeonjoon, et al. "Retargeting human-object interaction to virtual avatars." *IEEE transactions on visualization and computer graphics* vol. 22. Issue 11 (2016). pp 1-8.

Cho, Kyungmin, et al. "Motion recommendation for online character control." *ACM Transactions on Graphics (TOG)* vol. 40. Issue 6 (2021). pp 1-16.

Keller, Wolfgang, et al. "Thin plate spline interpolation." *Journal of Geodesy* vol. 93. Issue 9 (2019). pp 1-20.

\* cited by examiner

METHOD AND APPARATUS WITH OBJECT MOTION TRANSFER

CROSS-REFERENCE TO RELATED APPLICATIONS

This application claims the benefit under 35 USC § 119(a) of Korean Patent Application No. 10-2022-0016651, filed on Feb. 9, 2022, in the Korean Intellectual Property Office, the entire disclosure of which is incorporated herein by reference for all purposes.

BACKGROUND

1. Field

The following description relates to a method and apparatus with object motion transfer.

2. Description of Related Art

Telepresence may allow a person to perform actions in a separate virtual location as if the person is physically present in that virtual or distant location, and may represent or position a real object, or a character, in different virtual spaces in real time. Augmented reality (AR) may be implemented so that a motion of an object in a source space may be represented in a target space.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented method includes defining a mapping function from a source space to a target space, based on feature points of a source space where an object in motion is positioned, and feature points of a target space where the motion of the object is represented; determining a target root position corresponding to a root position of the object, based on the defined mapping function; determining a target direction corresponding to a direction of the object, based on the defined mapping function; determining a target main joint corresponding to a main joint of the object, based on the defined mapping function; determining a target sub-joint excluding the target main joint in the target space, based on unique joint information of the object; and generating data representing motion of the object in the target space by modifying a pose of the object in the target space to match the target main joint.

The feature points of the source space and the feature points of the target space may be determined based on a total number of vertices included in the source space or the target space in a plan view, and a total number of objects included in the source space or the target space, and wherein the total number of vertices included in the source space in the plan view and the total number of objects included in the source space may be respectively equal to the total number of vertices included the target space in the plan view and the total number of objects included in the target space.

When total number of vertices included in the source space or the target space in the plan view is m, and the total number of objects included in the source space or the target space is n, a total number of feature points of the source space or a total number of feature points of the target space may be respectively determined to be 2m+1+4n.

The mapping function may be defined by a weight vector that allows the feature points of the source space to respectively match their corresponding feature points of the target space.

The weight vector may be determined based on the feature points of the source space, the feature points of the target space, and thin plate spline (TPS) interpolation.

The determining of the target direction may include determining a first point based on a direction of the object in the source space; determining a target point, which corresponds to the first point, in the target space, based on the defined mapping function; and determining a direction from the target root position to the determined target point to be the target direction.

The main joint may include a wrist joint and an ankle joint.

The modifying of a pose of the object in the target space to match the target main joint may be performed based on inverse kinematics (IK).

The object may include a human figure, the source space may include one of a first virtual space and a first real space, and the target space may include one of a second virtual space and a second real space.

In a general aspect, an apparatus includes a memory configured to store computer-executable instructions; and one or more processors configured to execute the computer-executable instructions by accessing the memory, wherein the one or more processors are configured to: define a mapping function from a source space to a target space, based on feature points of a source space where an object in motion is positioned, and feature points of a target space where the motion of the object is represented, determine a target root position corresponding to a root position of the object, based on the defined mapping function, determine a target direction corresponding to a direction of the object, based on the defined mapping function, determine a target main joint corresponding to a main joint of the object, based on the defined mapping function, determine a target sub-joint excluding the target main joint in the target space, based on unique joint information of the object, and generate data representing motion of the object in the target space by modifying a pose of the object in the target space to match the target main joint.

The feature points of the source space and the feature points of the target space may be determined based on a total number of vertices included in the source or the target space in a plan view, and a total number of objects included in the source space or the target space, and wherein the total number of vertices included in the source space in the plan view and the total number of objects included in the source space may be respectively equal to the total number of vertices included in the target space in the plan view and the total number of objects included in the target space.

When the total number of vertices included in the source space or the target space in the plan view is m, and the total number of objects included in the source space or the target space is n, a total number of feature points of the source space or a total number of feature points of the target space may be respectively determined to be 2m+1+4n.

The mapping function may be defined by a weight vector that allows the feature points of the source space to respectively match their corresponding feature points of the target space.

The weight vector may be determined based on the feature points of the source space, the feature points of the target space, and thin plate spline (TPS) interpolation.

The one or more processors may be configured to determine a first point based on a direction of the object in the source space, determine a target point corresponding to the first point, in the target space, based on the defined mapping function, and determine a direction from the target root position to the determined target point to be the target direction.

The main joint may include a wrist joint and an ankle joint.

The pose of the object in the target space may be modified to match the target main joint, based on inverse kinematics (IK).

The object may include a human figure, the source space may include one of a first virtual space and a first real space, and the target space may include one of a second virtual space and a second real space.

The apparatus may include an augmented reality (AR) device and a virtual reality (VR) device.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
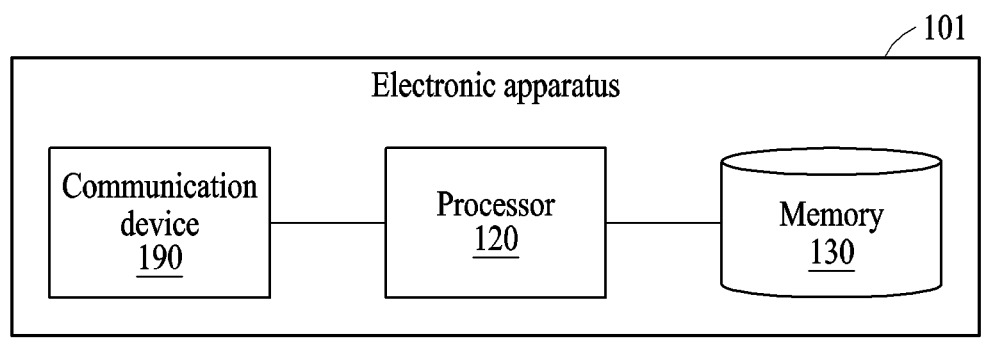
FIG. 1 illustrates an example electronic apparatus, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

One or more examples relate to a method and apparatus that transfers motion of an object in a source space to be represented in a target space that is similar to the source space.

FIG. 1 illustrates an example electronic apparatus 101, in accordance with one or more embodiments.

Referring to FIG. 1, the electronic apparatus 101 may include a memory 130 configured to store computer-executable instructions, a processor 120 configured to execute the computer-executable instructions by accessing the memory 130, and a communication device 190 configured to perform external communication. In a non-limiting example, the processor 120 may be a single processor, or one or more processors.

The processor 120 may process data received by the communication device 190 and data stored in the memory 130. A "processor" may be a data processing device implemented as computing hardware including a physically structured circuit to execute desired operations or instructions (e.g., coding), that, when executed by the computing hardware, configure the computing hardware to perform one or more operations and/or methods. Such instructions may be stored in a non-transitory recording medium, for example, that when read and executed by one or more processors or one or more microprocessors, configure the same to perform certain operations or methods. The data processing device refers to structure, as electronic hardware or computing hardware that performs one or more features of the present disclosure. The data processing device implemented as hardware may include, for example, a microprocessor, a central processing unit (CPU), a processor core, a multi-core processor, a multiprocessor, an application-specific integrated circuit (ASIC), and a field-programmable gate array (FPGA).

The processor 120 may execute computer-readable instructions (e.g., coding) stored in a memory (e.g., the memory 130). The memory 130 may store instructions executable by the processor 120.

The memory 130 may store the data received by the communication device 190 and the data processed by the processor 120. For example, the memory 130 may store instructions (e.g., coding). The stored instructions may be a set of syntaxes that are coded to generate data for motion of an object in a source space to be represented in a target space and executable by the processor 120.

The memory 130 may include, as non-limited examples, at least one of a volatile memory, a non-volatile memory, random-access memory (RAM), flash memory, a hard disk drive, and an optical disc drive. The memory 130 may store an instruction set (e.g., coding) to operate the electronic apparatus 101. The instruction set to operate the electronic apparatus 101 may be executed by the processor 120.

The communication device 190 may be connected to the processor 120 and the memory 130, and may respectively transmit and receive data thereto and therefrom. The communication device 190 may be connected to another external device and may transmit and receive data to and from the external device. Hereinafter, transmitting and receiving "A" may refer to transmitting and receiving "information or data indicating A." In a non-limiting example, the communication device 190 may be implemented as circuitry in the electronic apparatus 101. For example, the communication device 190 may include an internal bus and an external bus. As another example, the communication device 190 may be an element that connects the electronic apparatus 101 to an external device or a server, as examples. The communication device 190 may be an interface.

Hereinafter, a method of transferring the motion of an object from a source space to a target space by the electronic apparatus 101 will be described in detail with reference to FIGS. 2 through 10.

Figure 2:
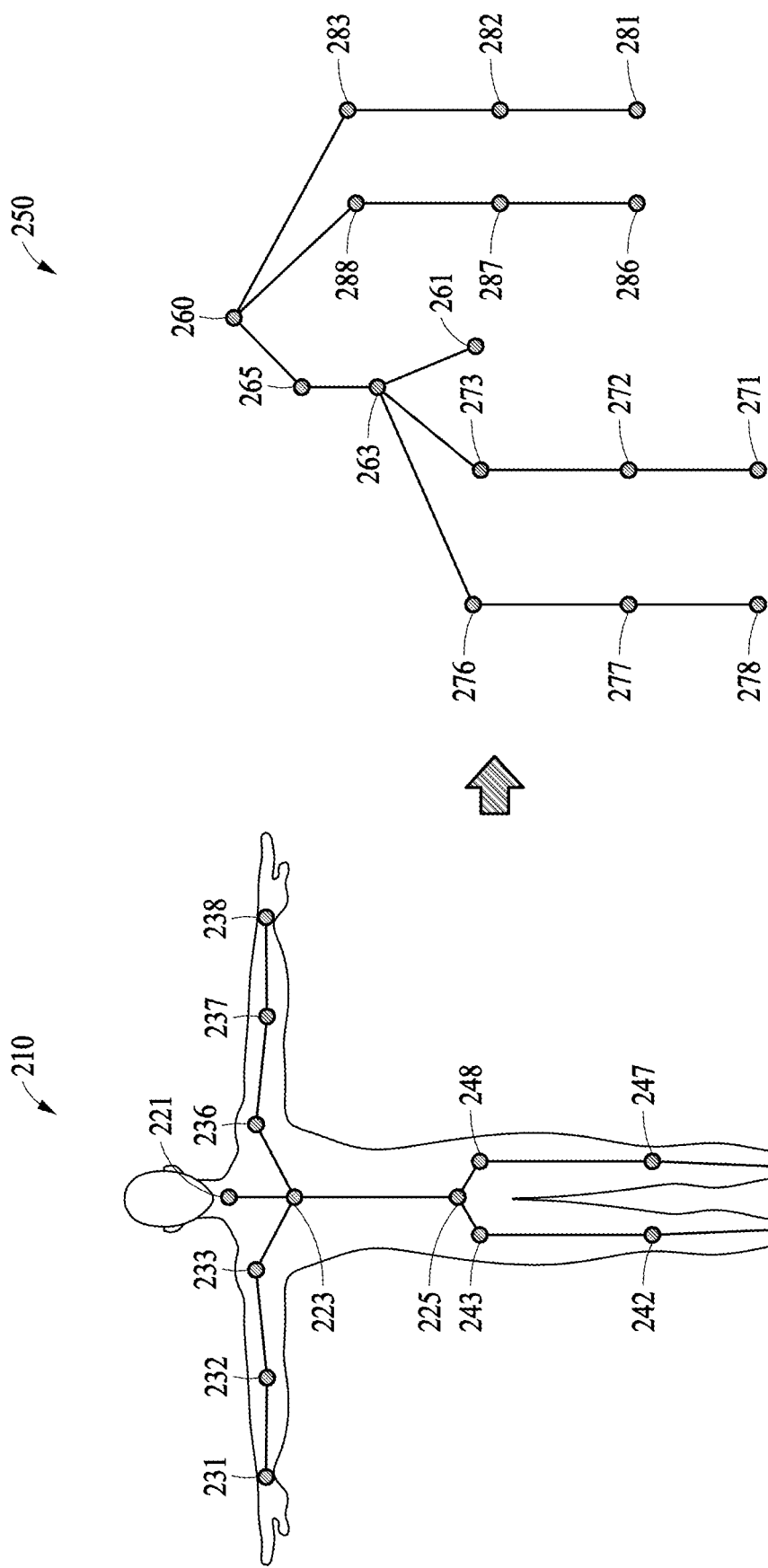
FIG. 2 illustrates an example of joint information configuring a human figure, in accordance with one or more embodiments.

FIG. 2 illustrates an example of joint information configuring a human figure, in accordance with one or more embodiments.

Referring to FIG. 2, a human FIG. 210, including a plurality of joints used to model a human figure in three dimensions (3D), and a joint hierarchical structure 250 are illustrated as an example. Although a human figure is illustrated in FIG. 2, this is only an example, and other objects, for example, animals, vehicles, or aircrafts, as only examples, may be implemented.

Referring to the human FIG. 210, the human body includes a plurality of main joints. The main joints may include a neck joint 221, an upper vertebral joint 223, a lower vertebral joint 225, a right wrist joint 231, a right elbow joint 232, a right shoulder joint 233, a left shoulder joint 236, a left elbow joint 237, a left wrist joint 238, a right ankle joint 241, a right knee joint 242, a right hip joint 243, a left ankle joint 246, a left knee joint 247, and a left hip joint 248. However, the main joints illustrated in the human FIG. 210 are merely examples. The main joints for 3D modeling of a human figure may be set in various ways.

The joint hierarchical structure 250 may be a structure map that describes a relationship between joints in 3D modeling. The joints illustrated in the joint hierarchical structure 250 may correspond to the main joints included in the human FIG. 210. For example, a neck joint 221, an upper vertebral joint 223, a lower vertebral joint 225, a right wrist joint 231, a right elbow joint 232, a right shoulder joint 233, a left shoulder joint 236, a left elbow joint 237, a left wrist joint 238, a right ankle joint 241, a right knee joint 242, a right hip joint 243, a left ankle joint 246, a left knee joint 247, and a left hip joint 248 may respectively correspond to joints 261, 263, 265, 271, 272, 273, 276, 277, 278, 281, 282, 283, 286, 287, and 288.

A root joint 260 that is not included in the human FIG. 210 may be included in an uppermost hierarchy of the joint hierarchical structure 250. As another example, the root joint 260 may correspond to the lower vertebral joint 225. A root joint may be a joint that is first set when 3D modeling the human body. When 3D modeling the human body, in determining a position of the human body in a space, the position of the human body may first be determined based on the root joint, and then, the human figure may be 3D modeled. In this example, the position of the root joint may be referred to as a root position.

A transformation of a joint at an upper hierarchy in the joint hierarchical structure 250 may affect a joint at a lower hierarchy. For example, in the joint hierarchical structure 250, motion of the joint 263 corresponding to the upper vertebral joint 223 may affect motion of the joints 261, 273, and 276, which are sub-joints. As another example, in the human FIG. 210, motion of the upper vertebral joint 223 may affect motion of the neck joint 221, the right shoulder joint 233, and the left shoulder joint 236 respectively corresponding to the joints 261, 273, and 276.

Although a human is used as an example with reference to FIG. 2, in a method of transferring motion of an object to be described with reference to FIGS. 3 through 10, the object is not limited to a human. The object may be an animal figure, as only an example, and 3D modeling of the object may be implemented based on joint information, in which the joint information may be different from the joint hierarchical structure 250. A method of transferring motion of an object from a source space to a target space will be described in detail with reference to FIGS. 3 through 10.

Figure 3:
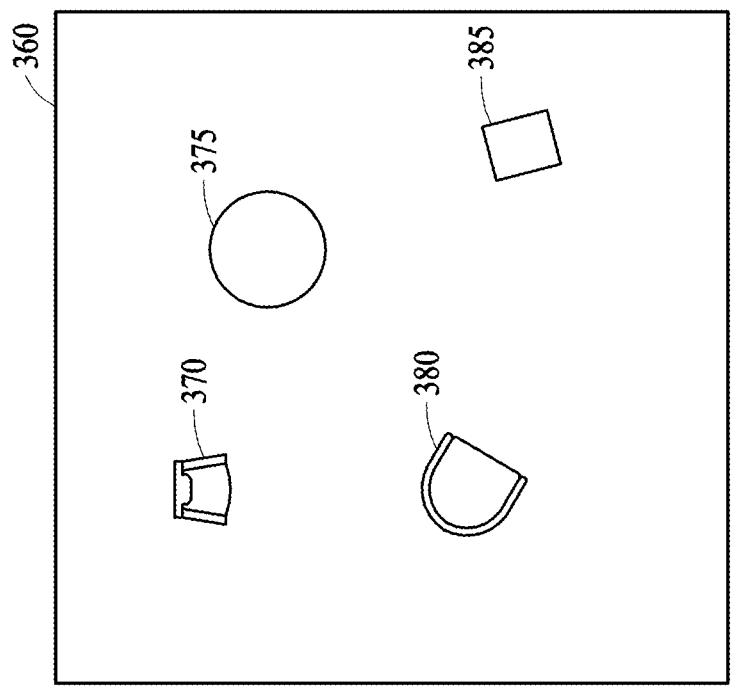
FIG. 3 illustrates an example source space and an example target space, in accordance with one or more embodiments.
Figure 3:
Figure 3:
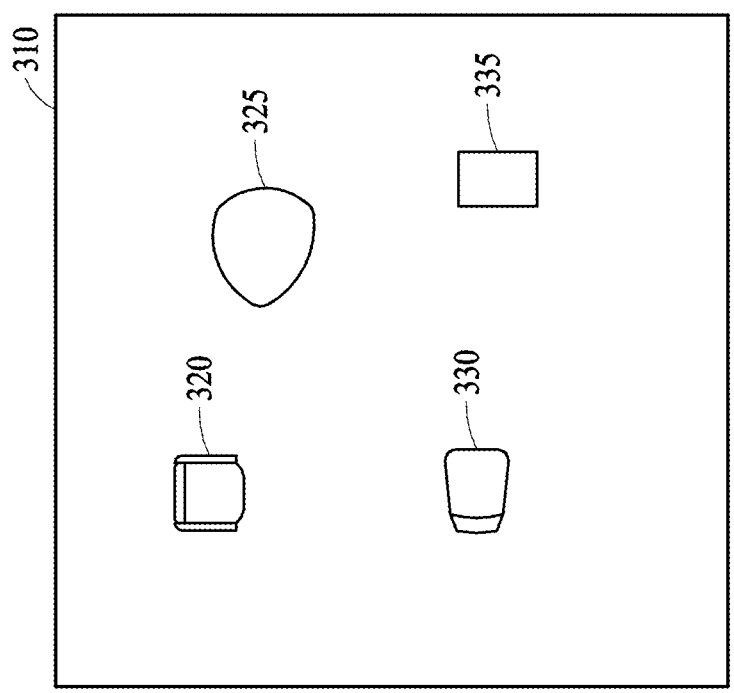

FIG. 3 illustrates an example of a source space and a target space, in accordance with one or more embodiments.

Referring to FIG. 3, illustrated are a plan view 310 of the source space viewed from above and a plan view 360 of the target space viewed from above. The plan view 310 of the source space and the plan view 360 of the target space hereinafter may be respectively referred to as a source space 310 and a target space 360 for ease of description.

The processor 120 of the electronic apparatus 101, described above with reference to FIG. 1, may generate data for motion of an object occurring in the source space 310 to be represented in the target space 360. Based on the generated data, the processor 120 may allow motion of an object in the source space 310 to be represented or reproduced in the target space 360. When motion of an object in a source space is represented or reproduced in a target space, such representation or reproduction by the processor 120 may be referred to as 'transferring' the motion of the object in the source space to the target space.

A mapping function from a source space to a target space may be defined for motion of an object in the source space 310 to be represented in the target space 360. The mapping function may be defined based on various ways and when the source space and the target space have similar environments.

That the source space and the target space have similar environments may mean a feature point (or a parameter of the mapping function) of the source space and a feature point of the target space may correspond to each other. The feature points of the source space and the target space may include vertices, centers of corners, and center points in plan views of the source space and the target space and four vertices of each of objects included in the source space and the target space.

Referring to FIG. 3, in an example, the source space 310 and the target space 360 may be quadrangular when viewed from above, and the number of vertices in the source space 310 and the target space 360 may be the same, for example, four, and the number of objects included in each of the source space 310 and the target space 360 may be the same, for example, four. Therefore, the processor 120 of the electronic apparatus 101 may determine that the number of feature points of the source space 310 and the target space 360 are the same, and may define a mapping function from the source space 310 to the target space 360. For example, the number of vertices of the source space 310 may be the same as the number of vertices of the target space 360, that is, for example, four, and the number of objects 320, 325, 330, and 335 included in the source space 310, which is, for example, four, may be the same as the number of objects 370, 375, 380, and 385 included in the target space 360, which is, for example, four. Therefore, the processor 120 may determine that the number of feature points of the source space 310 and the target space 360 are the same. A method of determining a feature point in each of a source space and a target space will be described in detail with reference to FIG. 4.

In an example, the source space 310 and the target space 360 may be a virtual space or a real space, and the electronic apparatus 101 may be an augmented reality (AR) device and a virtual reality (VR) device according to examples.

In an example, the source space 310 and the target space 360 may both be virtual spaces. For example, motion of a character in a computer-programmed file, such as an animation, may be represented as motion of a character in another animation.

In another example, the source space 310 may be a virtual space and the target space 360 may be a real space. For example, motion of an animation character in a virtual space may be represented as an AR character that is implemented in a real space.

In still another example, the source space 310 may be a real space and the target space 360 may be a virtual space. For example, motion of an AR character or a real human in a real space may be implemented as motion of a character in an animation in the virtual space.

In an example, the source space 310 and the target space 360 may both be real spaces. For example, motion of an AR character or a real human in a real space may be implemented as motion of an AR character in another real space.

Figure 4:
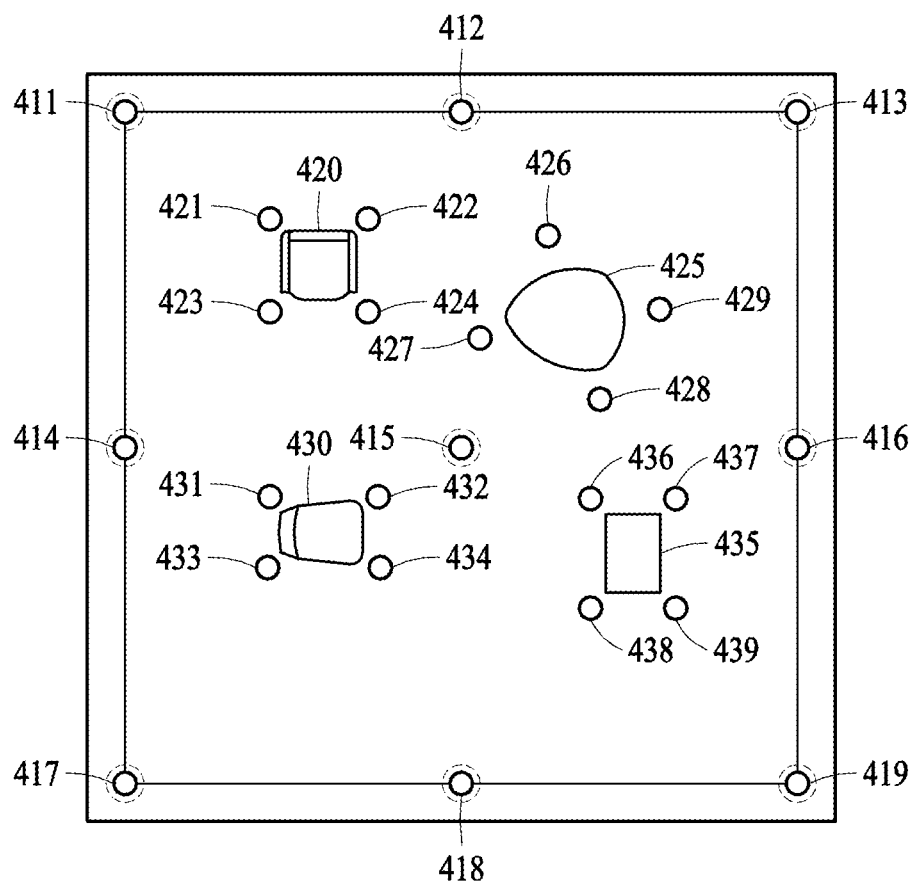
FIG. 4 illustrates an example of determining a feature point in a space, in accordance with one or more embodiments.

FIG. 4 illustrates an example of determining a feature point in a space, in accordance with one or more embodiments.

Referring to FIG. 4, illustrated is a feature point of a source space described above with reference to FIG. 3. As described above with reference to FIG. 3, a feature point of a space that defines a mapping function may be determined based on the number of vertices of a plan view of the space and the number of objects included in the space.

For example, when the plan view of the space is a figure having m vertices with n objects included in the space, 2m+1+4n feature points may be determined. Referring to FIG. 4, the plan view of the space is a figure having four vertices, and a total of 2×4+1=9 feature points may be determined based on vertices 411, 413, 417, and 419, center points 412, 414, 416, and 418 of corners, and a center point 415 of the plan view. In addition, referring to FIG. 4, a total of four objects 420, 425, 430, and 435 are included in the space, and 4×4=16 feature points 421-424, 426-429, 431-434, and 436-439 may be determined with four feature points being determined for each of the four objects 420, 425, 430, and 435. That is, for the space having four vertices (m=4) and including four objects (n=4) illustrated in FIG. 4, 2×4+1+4×4=25 feature points may be determined.

The space in FIG. 4 is described as a source space as an example for ease of description, however, a feature point for a target space may be determined in the same method. The source space 310 and the target space 360 described above with reference to FIG. 3 each include 25 feature points, each of the feature points of the source space 310 may respectively correspond to each of the feature points of the target space 360, and based on the feature points thereof, the processor 120 may define a mapping function.

As an example, the processor 120 of the electronic apparatus 101 may define a mapping function from a source space to a target space, based on thin plate spline (TPS) interpolation. A method of defining the mapping function from the source space to the target space by the processor 120 will be described in detail with reference to FIG. 5.

Figure 5:
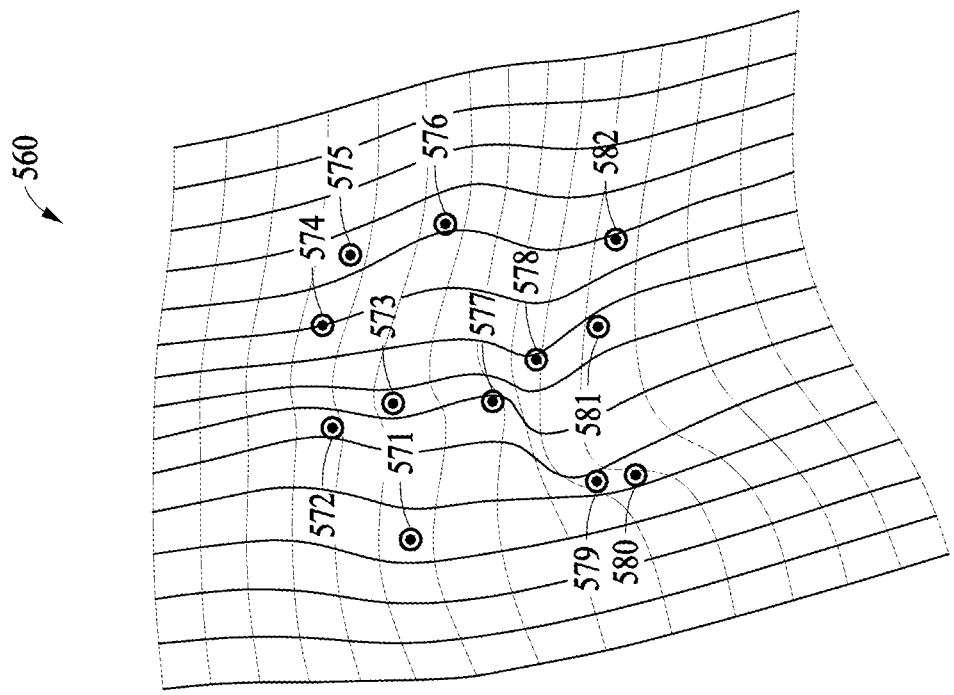
FIG. 5 illustrates an example of thin plate spline (TPS) interpolation, in accordance with one or more embodiments.
Figure 5:
Figure 5:
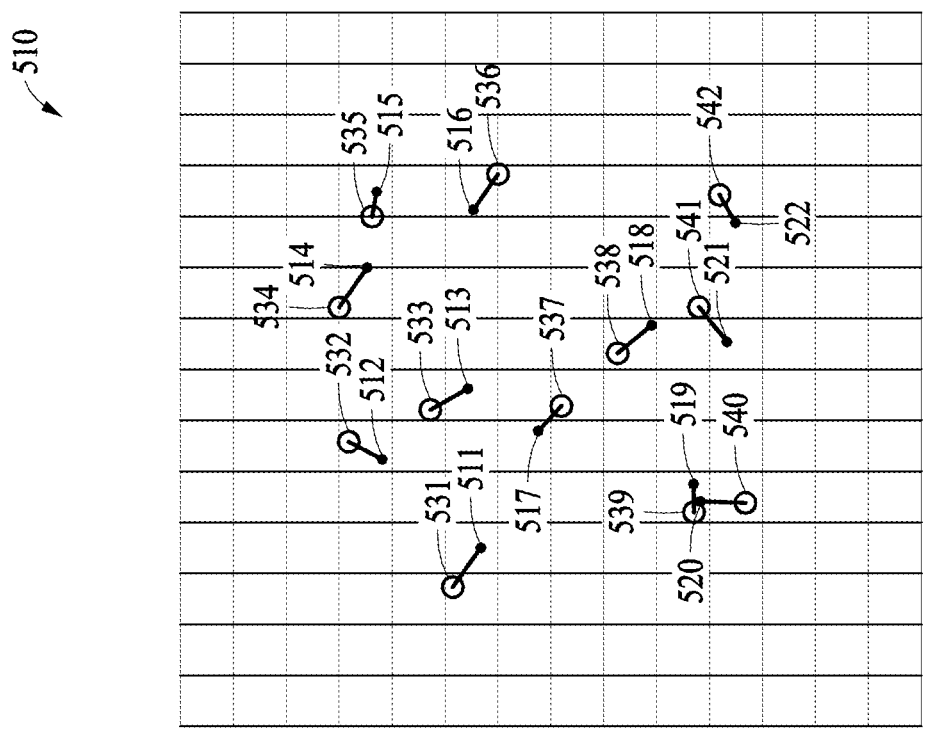

FIG. 5 illustrates an example of TPS interpolation, in accordance with one or more embodiments.

Referring to FIG. 5, illustrated are a state 510 in which feature points of a source space and a target space are illustrated in one plane and a state 560 in which their corresponding feature points are matched based on the TPS interpolation.

Referring to the state 510 in which feature points of a source space and a target space are illustrated in one plane, feature points 511, 512, 513, 514, 515, 516, 517, 518, 519, 520, 521, and 522 of the source space and feature points 531, 532, 533, 534, 535, 536, 537, 538, 539, 540, 541, and 542 of the target space are illustrated in one plane. The TPS interpolation refers to a method of defining mapping between different images, based on a transformation in which a thin film distorts. Referring to the state 560 in FIG. 5, the feature points 511, 512, 513, 514, 515, 516, 517, 518, 519, 520, 521, and 522 of the source space and the feature points 531, 532, 533, 534, 535, 536, 537, 538, 539, 540, 541, and 542 of the target space are matched to feature points 571, 572, 573, 574, 575, 576, 577, 578, 579, 580, 581, and 582 based on the TPS interpolation.

Corresponding feature points grouped together may be described as, for example, the feature point 511 of the source space and the feature point 531 of the target space may be matched to the feature point 571, and as another example, the feature point 512 of the source space and the feature point 532 of the target space may be matched to the feature point 572.

In an example, a mapping function to transform feature points of a source space and a target space to be matched, based on the TPS interpolation, is defined as Equation 1 below.

$$\begin{bmatrix} 0 & r_{1,2} & r_{1,3} & r_{1,4} & \cdots & r_{1,k} & 1 & p_1^T \\ r_{1,2} & 0 & r_{2,3} & r_{2,4} & \cdots & r_{2,k} & 1 & p_2^T \\ r_{1,3} & r_{2,3} & 0 & r_{3,4} & \cdots & r_{3,k} & 1 & p_3^T \\ r_{1,4} & r_{2,4} & r_{3,4} & 0 & \cdots & r_{4,k} & 1 & p_4^T \\ \vdots & \vdots & \vdots & \vdots & \ddots & \vdots & \vdots & \vdots \\ r_{1,k} & r_{2,k} & r_{3,k} & r_{4,k} & \cdots & 0 & 1 & p_k^T \\ 1 & 1 & 1 & 1 & \cdots & 1 & 0 & 0_{1\times 3} \\ p_1 & p_1 & p_1 & p_1 & \cdots & p_1 & 0_{1\times 3} & 0_{1\times 3} \end{bmatrix} * \begin{bmatrix} w_1^T \\ w_2^T \\ w_3^T \\ w_4^T \\ \vdots \\ w_k^T \\ w_{k+1}^T \\ w_{k+2}^T \\ w_{k+3}^T \\ w_{k+4}^T \end{bmatrix} = \begin{bmatrix} p_1'^T \\ p_2'^T \\ p_3'^T \\ p_4'^T \\ \vdots \\ p_k'^T \\ 0_{1\times 3} \\ 0_{1\times 3} \\ 0_{1\times 3} \\ 0_{1\times 3} \end{bmatrix} \quad \text{Equation 1}$$

In this example, $P_i$ is $[x_i \; y_i \; z_i]^T \in \mathbb{R}^{3\times 1}$ and may be an ith feature point of the source space. $P_i^{\ell}$ is $[x_i^{\ell} \; y_i^{\ell} \; z_i^{\ell}]^T \in \mathbb{R}^{3\times 1}$ and may be an ith feature point of the target space corresponding to the ith feature point of the source space. $w_i$ is an ith element of a weight vector and may be $w_i \in \mathbb{R}^{3\times 1}$. $r_{i,j}$ may be an element for applying an impact of other feature points and may be defined as, for example, $r_{i,j} = \|p_i - p_j\|^2 \ln\|p_i - p_j\|$.

As described above with reference to FIGS. 3 and 4, the processor 120 of the electronic apparatus 101 may define a mapping function based on a feature point of a source space and a feature point of a target space, and the defining of the mapping function may mean determining the weight vector in Equation 1 above.

In an example, the feature points 511, 512, 513, 514, 515, 516, 517, 518, 519, 520, 521, and 522 of the source space 510 may respectively match, through the weight vector in Equation 1, the feature points 531, 532, 533, 534, 535, 536, 537, 538, 539, 540, 541, and 542 of the target space 560.

Hereinafter, mapping from a source space to a target space will be described in detail with reference to FIG. 6, and a method of transferring motion of an object in the source space to a target space will be described with reference to FIGS. 7A through 7C and 8.

Figure 6:
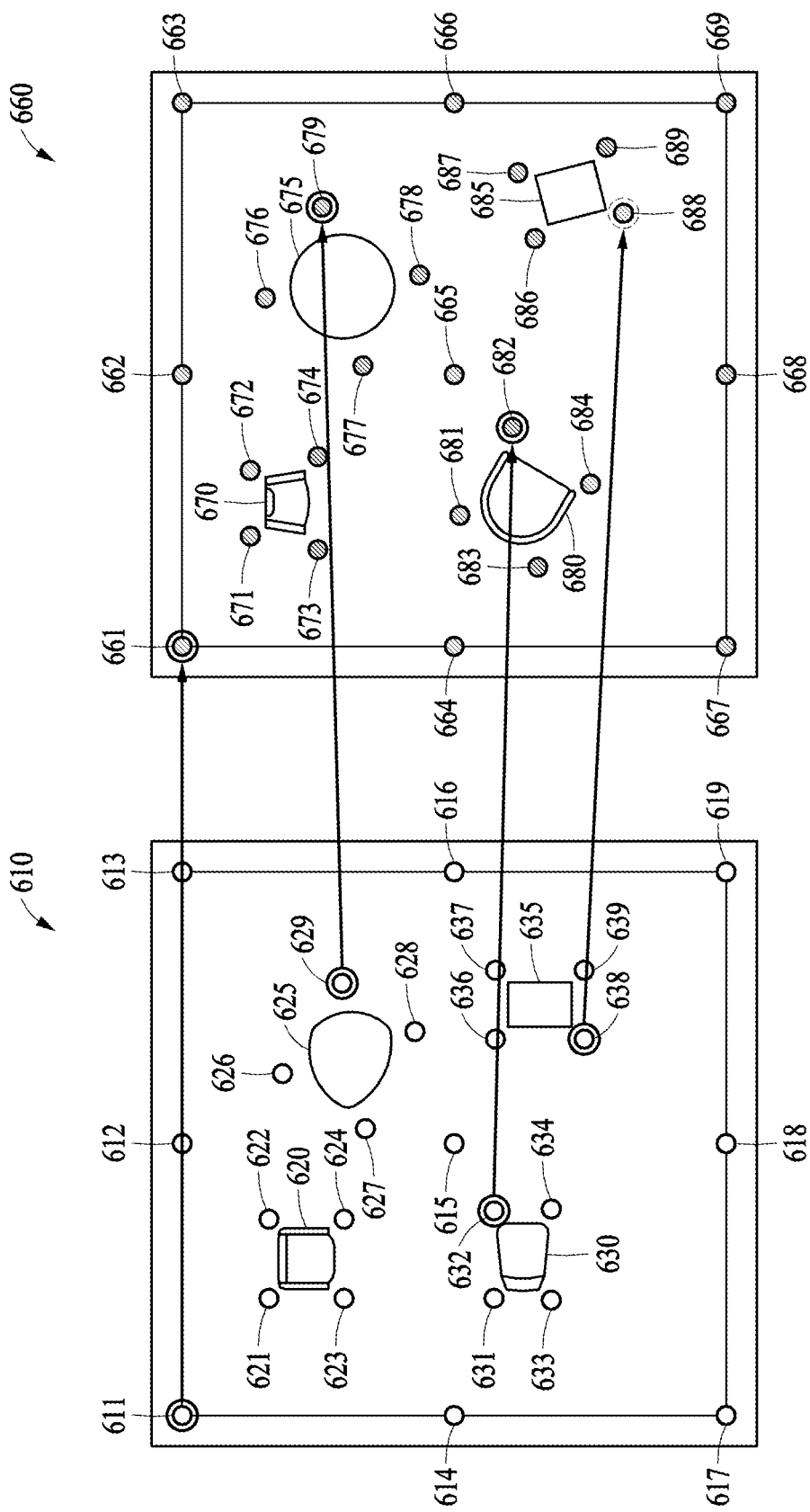
FIG. 6 illustrates an example of mapping from a source space to a target space, in accordance with one or more embodiments.

FIG. 6 illustrates an example of mapping from a source space to a target space, in accordance with one or more embodiments.

Referring to FIG. 6, feature points are determined as described above with reference to FIG. 4 for the source space 310 and the target space 360 described above with reference to FIG. 3. A source space 610 and a target space 660 of FIG. 6 each may include four vertices and four objects and as described above with reference to FIG. 4, each may include 25 feature points.

For example, in the source space 610, vertices 611, 613, 617, and 619, center points 612, 614, 616, and 618 of corners, and a center point 615 of a plan view thereof may be determined to be feature points, and for each of objects 620, 625, 630, and 635 included in the source space 610, four feature points (e.g., feature points 621, 622, 623, 624, 626, 627, 628, 629, 631, 632, 633, 634, 636, 637, 638, and 639) may be determined.

In the same method, in the target space 660, vertices 661, 663, 667, and 669, center points 662, 664, 666, and 668 of corners, and a center point 665 of a plan view thereof may be determined to be feature points, and for each objects 670, 675, 680, and 685 included in the target space 660, four feature points (e.g., feature points 671, 672, 673, 674, 676, 677, 678, 679, 681, 682, 683, 684, 686, 687, 688, and 689) may be determined.

As described above with reference to FIG. 5, the processor 120 may define a mapping function by determining a weight function. In an example, the processor 120 may transfer a position in a source space to a target space, based on the mapping function. For example, when a weight vector (e.g., the weight vector of Equation 1) of the mapping function is determined based on a feature point of the source space 610 and a feature point of the target space 660, based on the determined weight vector, a position in the target space 660 corresponding to a position in the source space 610 may be determined.

In an example, the processor 120 may determine a position P=[x y z] in the target space corresponding to a position $P^l = [x^l \; y^l \; z^l]$ in the source space, based on the mapping function, which may be represented as Equation 2 below.

$$[r_1 \; r_2 \; r_3 \; r_4 \; \cdots \; r_k \; 1 \; p^T] * \begin{bmatrix} w_1^T \\ w_2^T \\ w_3^T \\ w_4^T \\ \vdots \\ w_k^T \\ w_{k+1}^T \\ w_{k+2}^T \\ w_{k+3}^T \\ w_{k+4}^T \end{bmatrix} = p'^T \quad \text{Equation 2}$$

In this example, $r_i$ may be determined by $r_i = \|p_i - p\|^2 \ln\|p_i - p\|$.

Hereinafter, an example of the feature points 611, 629, 632, and 638 of the source space 610 input to the mapping function is described with reference to FIG. 6. In an example, the processor 120, based on Equation 2, for the feature point 611 of the source space 610 may determine a position (e.g., the feature point 661), which corresponds to the feature point 611, in the target space 660. As another example, the processor 120, based on Equation 2, for the feature point 629 of the source space 610, may determine a position (e.g., the feature point 679), which corresponds to the feature point 629, in the target space 660. In an example, the processor 120, based on Equation 2, for the feature point 632 of the source space 610, may determine a position (e.g., the feature point 682), which corresponds to the feature point 632, in the target space 660. In an example, the processor 120, based on Equation 2, for the feature point 638 of the source space 610, may determine a position (e.g., the feature point 688), which corresponds to the feature point 638, in the target space 660.

FIG. 6 only illustrates an example of the feature points of the source space 610 input to the mapping function, but examples are not limited thereto. The processor 120 may input a point in the source space 610 to the mapping function and determine a position, which corresponds to the input point, in the target space 660. In an example, the processor 120 may input a root position or main joint of an object in motion in the source space 610 to the mapping function and determine a target root position or target main joint in the target space 660. An operation of determining a target root position and a target root joint will be described in detail with reference to FIGS. 7A through 7C, and FIG. 8.

Figure 7A:
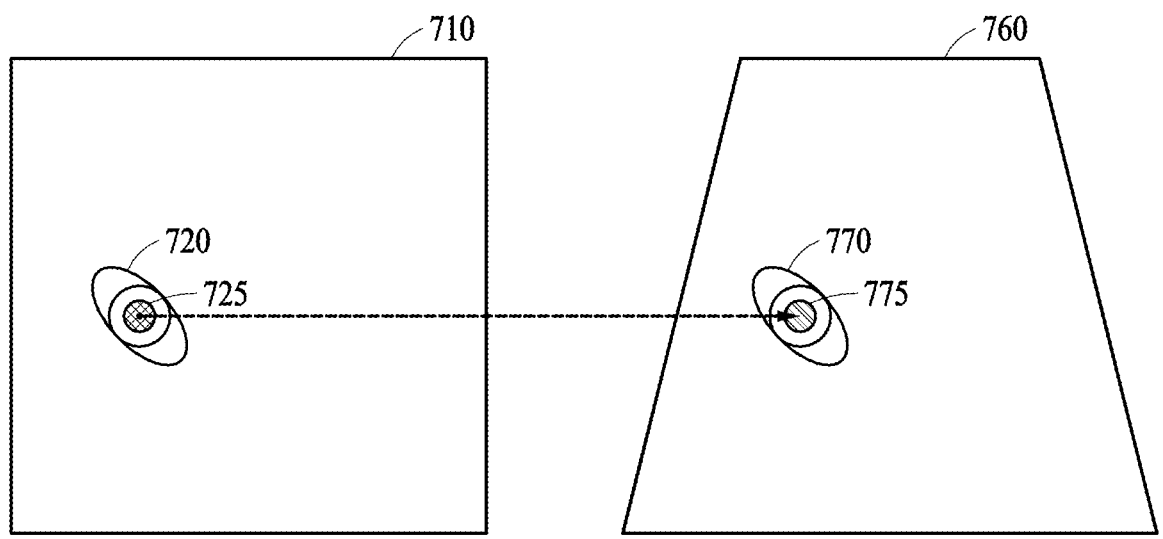
FIGS. 7A, 7B, and 7C each illustrate an example operation of determining a target direction of an object in a target space, in accordance with one or more embodiments.
Figure 7B:
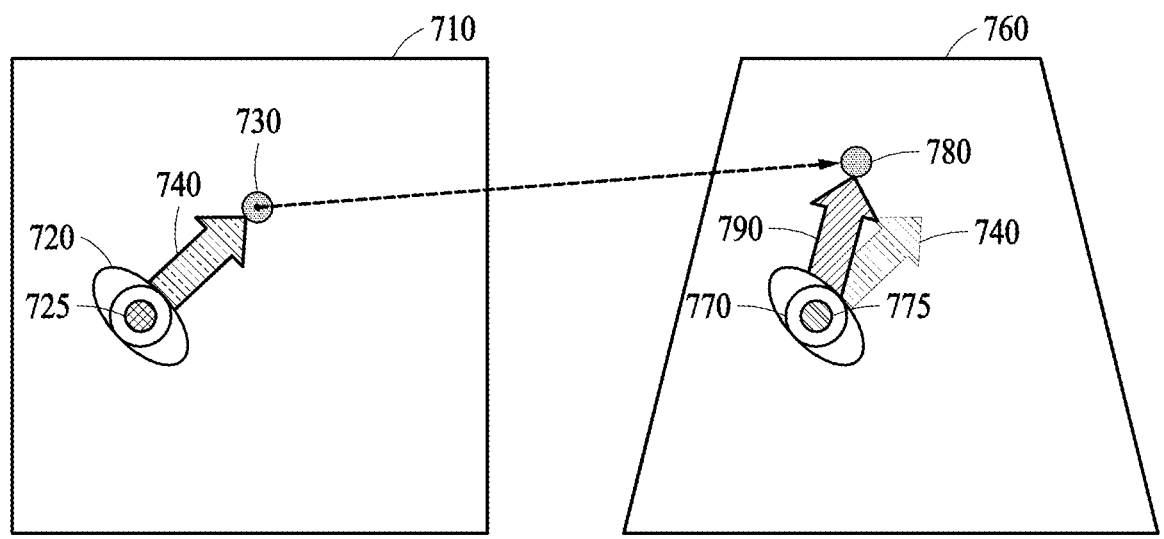
Figure 7C:
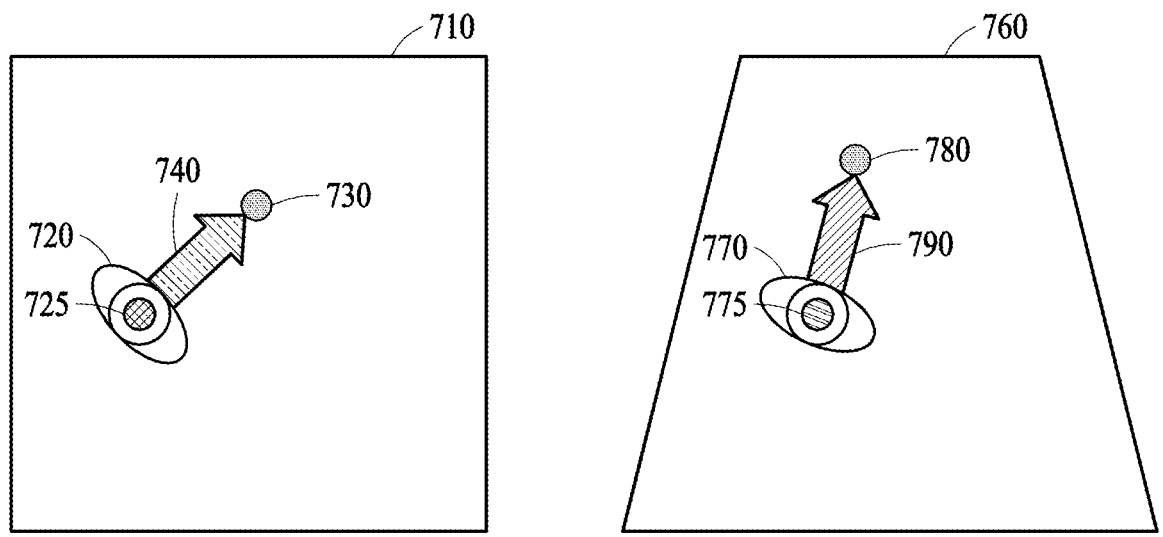

FIGS. 7A through 7C each illustrate an example operation of determining a target direction of an object in a target space, in accordance with one or more embodiments.

Referring to FIG. 7A, illustrated are a root position 725 corresponding to an object 720 in a source space 710, and a target root position 775 corresponding to an object 770 in a target space 760. In a non-limiting example, the respective objects 720 and 770 of FIG. 7A may be a person viewed from above.

In an example, the root position 725 of the object 720 may be a position corresponding to the root joint 260 described above with reference to FIG. 2. After the target root position 775 corresponding to the root position 725 is determined, the other joints in the object 770 in the target space 760 may be determined.

A target root position may mean a position of an object in a target space, and a pose of the object may be reproduced based on a joint after the target root position is determined. As described above with reference to FIG. 6, the processor 120 may determine the target root position 775 in the target space 760 by inputting the root position 725 of the object 720 in the source space 710 to a mapping function.

FIGS. 7B and 7C are diagrams illustrating a process of determining a target direction of an object in a target space.

Referring to FIG. 7B, illustrated is a process where a direction 740 of movement of an object in a source space 710 determines a target direction 790, of a movement which corresponds to the movement direction 740 of the object in the source space 710, in a target space 760.

In an example, the processor 120 may determine a point 730 based on the direction 740 of an object 720 in the source space 710. The processor 120, as described above with reference to FIG. 6, by inputting the point 730 of the source space 710 to a mapping function, may determine a target point 780 in the target space 760, which corresponds to the point 730, in the source space 710. The processor 120, as described above with reference to FIG. 7, may determine a direction from a target root position 775, which the processor 120 determined prior, to the target point 780 to be the target direction 790 of an object 770 in the target space 760.

When a target direction is determined as described with reference to FIG. 7B, for natural pose reproduction in the target space 760, the processor 120 may adjust a direction of an object. Referring to FIG. 7C, a direction of an object 770 in a target space 760 may be adjusted to match a target direction 790.

To transfer motion of an object in a source space to a target space, the processor 120, after determining a target root position 775 and a target direction 790, may determine a joint position and adapt a pose. An operation of determining a joint position and adapting a pose in a target space by the processor 120 of the electronic apparatus 101 will be described in detail with reference to FIG. 8.

Figure 8:
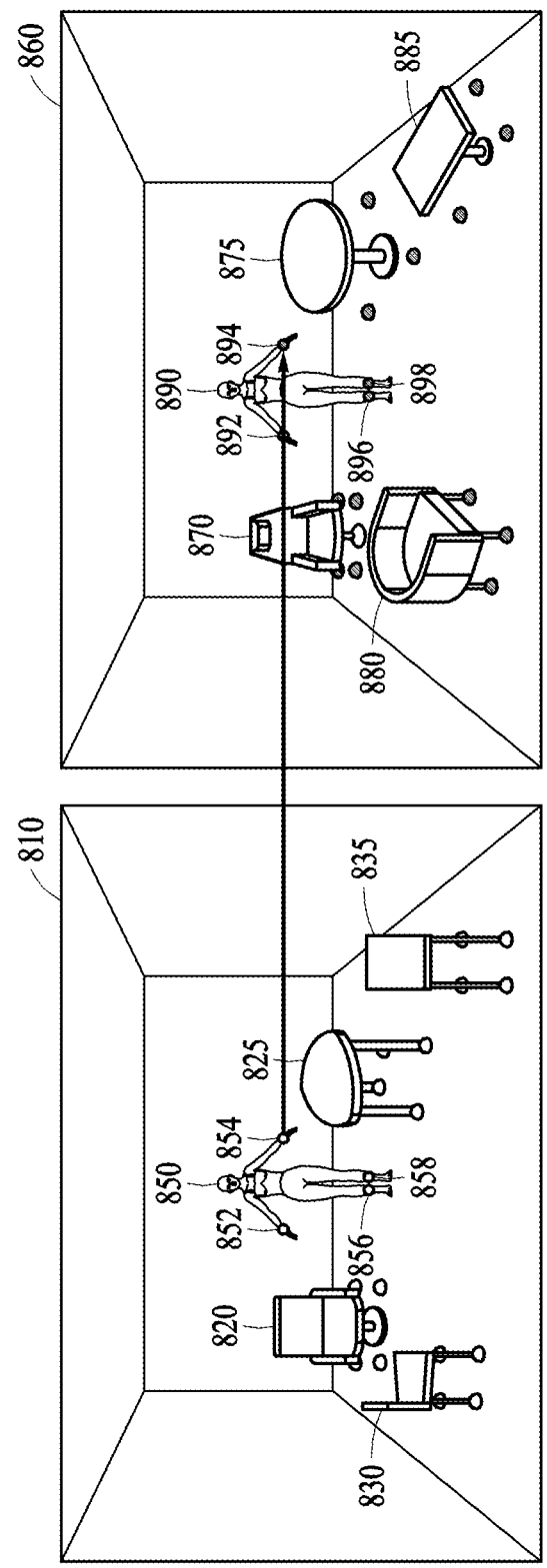
FIG. 8 illustrates an example of determining a target main joint in a target space, in accordance with one or more embodiments.

FIG. 8 illustrates an example of determining a target main joint in a target space, in accordance with one or more embodiments.

Referring to FIG. 8, illustrated are an object 850 in a source space 810 and an object 890 in a target space 860. As described above with reference to FIGS. 3 through 7, the environments of the source space 810 and the target space 860 may be similar and the processor 120 of the electronic apparatus 101 may define a mapping function from the source space 810 to the target space 860. In an example, the numbers of feature points of the source space 810 and the target space 860 may be the same, for example, 25 feature points, and the number of objects, for example, four objects, 820, 825, 830, and 835 included in the source space 810 may be the same as the number of objects, for example, four objects 870, 875, 880, and 885 included in the target space 860.

As described above with reference to FIG. 6, the processor 120, by inputting a position in a source space to a mapping function, may determine a position, which corresponds to the input position, in a target space. Referring to FIG. 8, the source space 810 may include the object 850, and the object 850 may include a plurality of joints. In a non-limiting example, the object 850 may be a person, and the person may include a plurality of joints as described above with reference to FIG. 2.

In an example, the processor 120 may determine a target main joint in a target space by inputting main joint information of the object 850 in the source space 810 to a mapping function. For example, referring to FIG. 8, two wrist joints 852 and 854 and two ankle joints 856 and 858 among a plurality of joints included in the object 850 may be main joints, and the processor 120, by inputting positions of the four main joints to a mapping function, may determine target main joints 892, 894, 896, and 898 in the target space 860. However, main joints may be set otherwise except for two wrist joints and two ankle joints, for example, the main joints may be set among any of the joints described with reference to FIG. 2.

In an example, the processor 120, based on unique joint information of an object (or local rotation information), may determine the rest of the joints of the object in a target space. For example, the processor 120 may obtain the unique joint information of the object in advance and based on the obtained unique joint information of the object, may determine target sub-joints except for the target main joints 892, 894, 896, and 898 of the object 890 in the target space 860. The unique joint information of an object may be information on a relationship among joints of an object in a source space. When a target main joint is determined for an object in a target space, the processor 120, based on the relationship among joints of an object in a source space, not on a mapping function, may determine sub-joints except for the target main joint.

As described above with reference to FIGS. 7A through 7C, the processor 120 may obtain information on a target root position and a target direction of an object in a target space and, as described above with reference to FIG. 8, may determine a target main joint and a target sub-joint. Based on this, the processor 120 of the electronic apparatus 101, by modifying or adapting a pose of the object in the target space to match the target main joint, may generate data representing motion of the object in the target space.

In an example, the processor 120 may modify the pose of the object, based on inverse kinematics (IK). Accordingly, a foot-sliding issue may be alleviated, which may occur when the motion of the object is represented in the target space.

Figure 9:
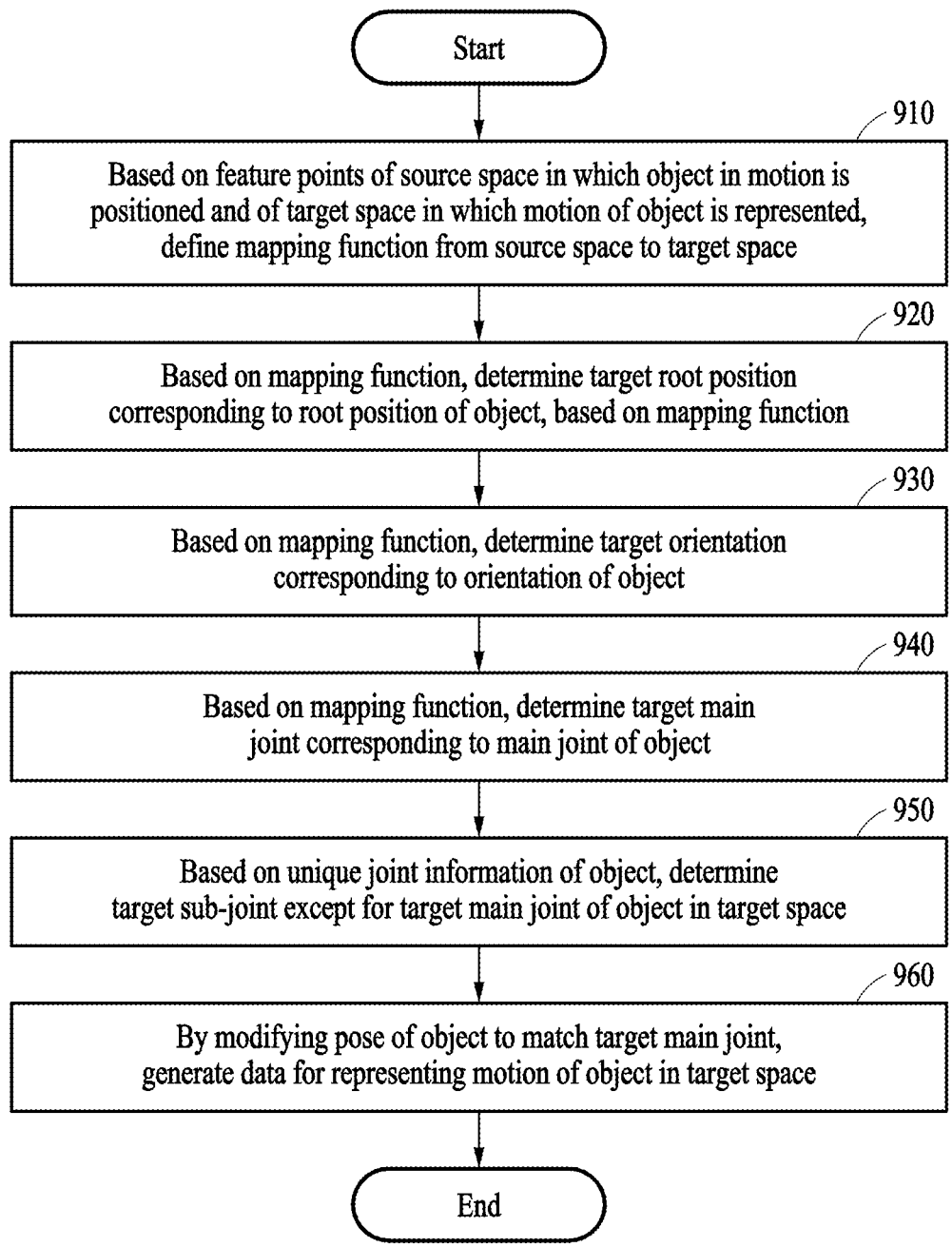
FIG. 9 illustrates an example operation of an example electronic apparatus, in accordance with one or more embodiments.

FIG. 9 illustrates an example operation of an electronic apparatus, in accordance with one or more embodiments. The operations in FIG. 9 may be performed in the sequence and manner as shown. However, the order of some operations may be changed, or some of the operations may be omitted, without departing from the spirit and scope of the shown example. Additionally, operations illustrated in FIG. 9 may be performed in parallel or simultaneously. One or more blocks of FIG. 9, and combinations of the blocks, can be implemented by special purpose hardware-based computer that perform the specified functions, or combinations of special purpose hardware and instructions, e.g., computer or processor instructions. In addition to the description of FIG. 9 below, the descriptions of FIGS. 1-8 are also applicable to FIG. 9 and are incorporated herein by reference. Thus, the above description may not be repeated here for brevity purposes. The operations of FIG. 9 may be performed by a processor.

Operations 910 through 960 may be performed by the processor 120 of the electronic apparatus 101 described above with reference to FIG. 1. Operations 910 through 960 relate to the transferring of a motion of an object in a source space to a target space by implementing the processor 120 of the electronic apparatus 101 described with reference to FIGS. 2 through 8.

Therefore, the description provided with reference to FIGS. 1 through 8 is not repeated for conciseness.

In operation 910, based on feature points of a source space in which an object in motion is positioned, and feature points a target space in which motion of the object is represented, the processor 120 may define a mapping function from the source space to the target space. In an example, as described above with reference to FIGS. 3 and 4, the source space and the target space may have similar environments, and, in a non-limited example, the source space and the target space may include the same number of vertices and the same number of objects. As described above with reference to FIG. 5, the processor 120 may define a mapping function by determining the weight vector of Equation 1, based on TPS interpolation.

In operation 920, the processor 120, based on the mapping function, may determine a target root position corresponding to a root position of the object, based on the mapping function. As described above with reference to FIGS. 6 and 7A through 7C, the processor 120, based on Equation 2, by inputting the root position of the object in the source space to the mapping function, may determine the target root position in the target space.

In operation 930, the processor 120, based on the mapping function, may determine a target direction corresponding to a direction of the object. An operation of determining a target direction will be described in detail with reference to FIG. 10.

In operation 940, the processor 120, based on the mapping function, may determine a target main joint corresponding to a main joint of the object. As described above with reference to FIG. 8, the main joint of the object may include a wrist joint and an ankle joint, and the processor 120, based on Equation 2, by inputting a position of the main joint in the source space to the mapping function, may determine the target main joint of the object in the target space.

In operation 950, the processor 120, based on unique joint information of the object, may determine a target sub-joint except for the target main joint of the object in the target space. As described above with reference to FIGS. 2 and 8, in a non-limited example, the object may be a person and may include a plurality of joints. In operation 950, the processor 120, based on the unique joint information of the object (e.g., local rotation information), not on the mapping function, may determine the target sub-joint of the object in the target space.

In operation 960, the processor 120, by modifying a pose of the object to match the target main joint, may generate data representing motion of the object in the target space. As described above with reference to FIG. 8, the processor 120, by modifying the pose of the object, based on IK, may generate data naturally representing the motion of the object in the target space.

As described above with reference to FIG. 3, the source space and the target space may be a virtual space or a real space, and the processor 120, based on the data generated in operation 960, may represent or reproduce the motion of the object in the target space. For example, the processor 120 may represent motion of a character in a target space, which is a virtual space, or represent motion of a character based on Augmented reality (AR) in a real space.

Figure 10:
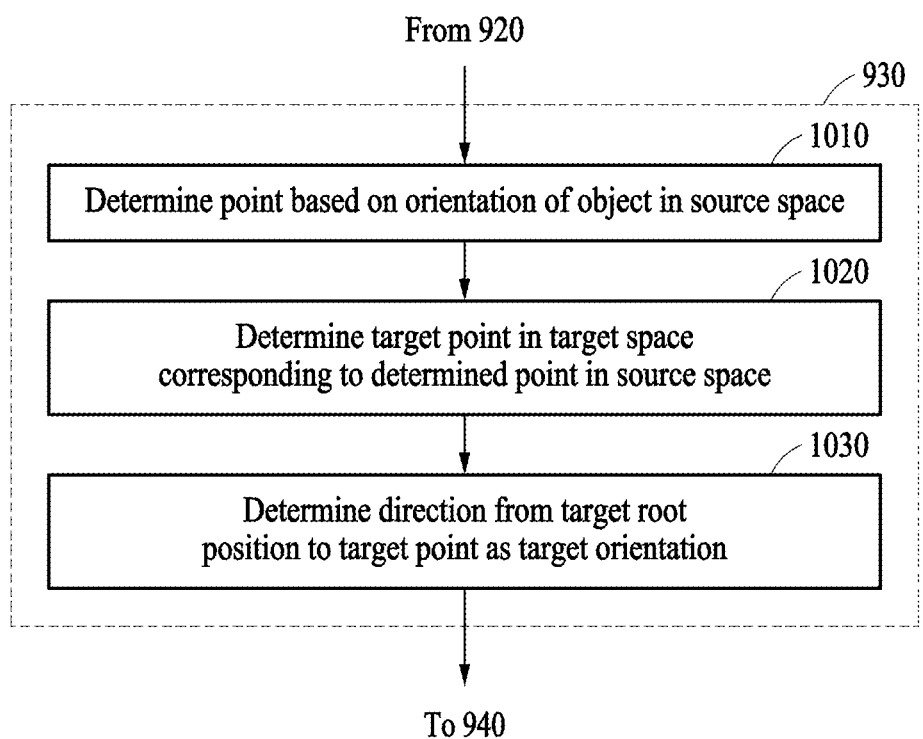
FIG. 10 illustrates an example method of determining a target direction of an object in a target space, in accordance with one or more embodiments.

FIG. 10 illustrates an example of a method of determining a target direction of an object in a target space, in accordance with one or more embodiments. The operations in FIG. 10 may be performed in the sequence and manner as shown. However, the order of some operations may be changed, or some of the operations may be omitted, without departing from the spirit and scope of the shown example. Additionally, operations illustrated in FIG. 10 may be performed in parallel or simultaneously. One or more blocks of FIG. 10, and combinations of the blocks, can be implemented by special purpose hardware-based computer that perform the specified functions, or combinations of special purpose hardware and instructions, e.g., computer or processor instructions. In addition to the description of FIG. 10 below, the descriptions of FIGS. 1-9 are also applicable to FIG. 10 and are incorporated herein by reference. Thus, the above description may not be repeated here for brevity purposes. The operations of FIG. 10 may be performed by a processor.

Operations 1010 to 1030 may be performed by the processor 120 of the electronic apparatus 101 described above with reference to FIG. 1. Therefore, the description provided with reference to FIGS. 1 through 9 is not repeated for conciseness.

In an example, operations 1010 through 1030 may correspond to an operation (e.g., operation 930 of FIG. 9) of determining a target direction of an object described with reference to FIG. 9.

In operation 1010, the processor 120 may determine a point based on a direction of an object in a source space. As described above with reference to FIG. 7A, the processor 120 may determine the point based on the direction of the object in the source space.

In operation 1020, the processor 120, based on a mapping function, may determine a target point, which corresponds to the determined point in the source space, in a target space. As described above with reference to FIG. 7B, the processor 120, by inputting the point in the source space to the mapping function, may determine the target point in the target space.

In operation 1030, the processor 120 may determine a direction from a target root position to the target point to be a target direction. As described above with reference to FIG. 7B, the processor 120 may determine a direction from the target root position determined in operation 920 to the target point determined in operation 1020 to be the target direction. When the target direction is determined in operation 1030, the processor 120 may rotate the object in the target space to match the target direction. In an example, as described above with reference to FIG. 7C, the processor 120 may modify a direction of the object in the target space towards the target direction.

The communication device 190, processor 120, memory 130, and other devices, and other components described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-10, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that be performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, comprising:
defining a mapping function for mapping points from a source space to respectively corresponding points of a target space, based on feature points of the source space where an object in motion is positioned and based on feature points of the target space where the motion of the object is represented, the source space and the target space having a same number of dimensions;
using the mapping function to map a root position point of the object in the source space to a corresponding target root position point in the target space;
using the mapping function to map a source direction of the object in the source space to a corresponding target direction of the object in the target space;
using the mapping function to map a main joint point of the object in the source space to a corresponding target main joint point of the object in the target space;
determining a target sub-joint point in the target space, the determining based on the target main joint point and based on joint information of the object that interrelates joints of the object in the source space, wherein the target sub-joint is not the target main joint and is determined based on a relation to the target main joint indicated by the joint information;
generating data representing motion of the object in the target space by modifying a pose of the object in the target space to match the target main joint; and
displaying an animation according to the data representing the motion of the object.

2. The method of claim 1, wherein:
the feature points of the source space and the feature points of the target space are determined based on a total number of vertices included in the source space or the target space in a plan view, and a total number of objects included in the source space or the target space, and
wherein the total number of vertices included in the source space in the plan view and the total number of objects included in the source space are respectively equal to the total number of vertices included the target space in the plan view and the total number of objects included in the target space.

3. The method of claim 2, wherein:
when the total number of vertices included in the source space or the target space in the plan view is m, and the total number of objects included in the source space or the target space is n, a total number of feature points of the source space or a total number of feature points of the target space is respectively determined to be 2m+1+4n.

4. The method of claim 1, wherein the mapping function is defined by a weight vector that allows the feature points of the source space to respectively match their corresponding feature points of the target space.

5. The method of claim 4, wherein the weight vector is determined based on the feature points of the source space, the feature points of the target space, and thin plate spline (TPS) interpolation.

6. The method of claim 1, wherein the determining of the target direction comprises:
determining a first point based on a direction of the object in the source space; determining a target point, which corresponds to the first point, in the target space, based on the defined mapping function; and
determining a direction from the target root position to the determined target point to be the target direction.

7. The method of claim 1, wherein the main joint comprises a wrist joint or an ankle joint.

8. The method of claim 1, wherein the modifying of a pose of the object in the target space to match the target main joint point is performed based on inverse kinematics (K).

9. The method of claim 1, wherein:
the object comprises a human figure,
the source space comprises one of a first virtual space and a first real space, and the target space comprises one of a second virtual space and a second real space.

10. A non-transitory computer-readable storage medium storing instructions that, when executed by a processor, cause the processor to perform the method of claim 1.

11. An apparatus, comprising:
a memory configured to store computer-executable instructions; and one or more processors configured to execute the computer-executable instructions by accessing the memory,
wherein the one or more processors are configured to:
define a mapping function for mapping points from a source space to respectively corresponding points of a target space, based on feature points of the source space where an object in motion is positioned and based on feature points of the target space where the motion of the object is represented, the source space and the target space having a same number of dimensions,
use the mapping function to map a root position point the object in the source space to a corresponding target root position point in the target space,
use the mapping function to map a source direction of the object in the source space to a corresponding target direction of the object in the target space,
use the mapping function to map a main joint point of the object in the source space to a corresponding target main joint point of the object in the target space,
determine a target sub-joint point in the target space, the determining based on the target main joint point and based on joint information of the object that interrelates joints of the object in the source space, wherein the target sub-joint is not the target main joint and is determined based on a relation to the target main joint indicated by the joint information, and generate data representing motion of the object in the target space by modifying a pose of the object in the target space to match the target main joint.

12. The apparatus of claim 11, wherein:

the feature points of the source space and the feature points of the target space are determined based on a total number of vertices included in the source or the target space in a plan view, and a total number of objects included in the source space or the target space, and wherein the total number of vertices included in the source space in the plan view and the total number of objects included in the source space are respectively equal to the total number of vertices included in the target space in the plan view and the total number of objects included in the target space.

13. The apparatus of claim 12, wherein:

when the total number of vertices included in the source space or the target space in the plan view is m, and the total number of objects included in the source space or the target space is n, a total number of feature points of the source space or a total number of feature points of the target space is respectively determined to be 2m+1+4n.

14. The apparatus of claim 11, wherein the mapping function is defined by a weight vector that allows the feature points of the source space to respectively match their corresponding feature points of the target space.

15. The apparatus of claim 14, wherein the weight vector is determined based on the feature points of the source space, the feature points of the target space, and thin plate spline (TPS) interpolation.

16. The apparatus of claim 11, wherein the one or more processors are configured to:

determine a first point based on a direction of the object in the source space, determine a target point corresponding to the first point, in the target space, based on the defined mapping function, and determine a direction from the target root position to the determined target point to be the target direction.

17. The apparatus of claim 11, wherein the main joint comprises a wrist joint or an ankle joint.

18. The apparatus of claim 11, wherein the pose of the object in the target space is modified to match the target main joint point, based on inverse kinematics (IK).

19. The apparatus of claim 11, wherein:

the object comprises a human figure, the source space comprises one of a first virtual space and a first real space, and the target space comprises one of a second virtual space and a second real space.

20. The apparatus of claim 11, wherein the apparatus comprises an augmented reality (AR) device and a virtual reality (VR) device.

* * * * *